April 11, 1944.  J. BELADA  2,346,549
MECHANISM FOR HANDLING CLOSURE BLANKS
Filed June 12, 1942  3 Sheets-Sheet 1
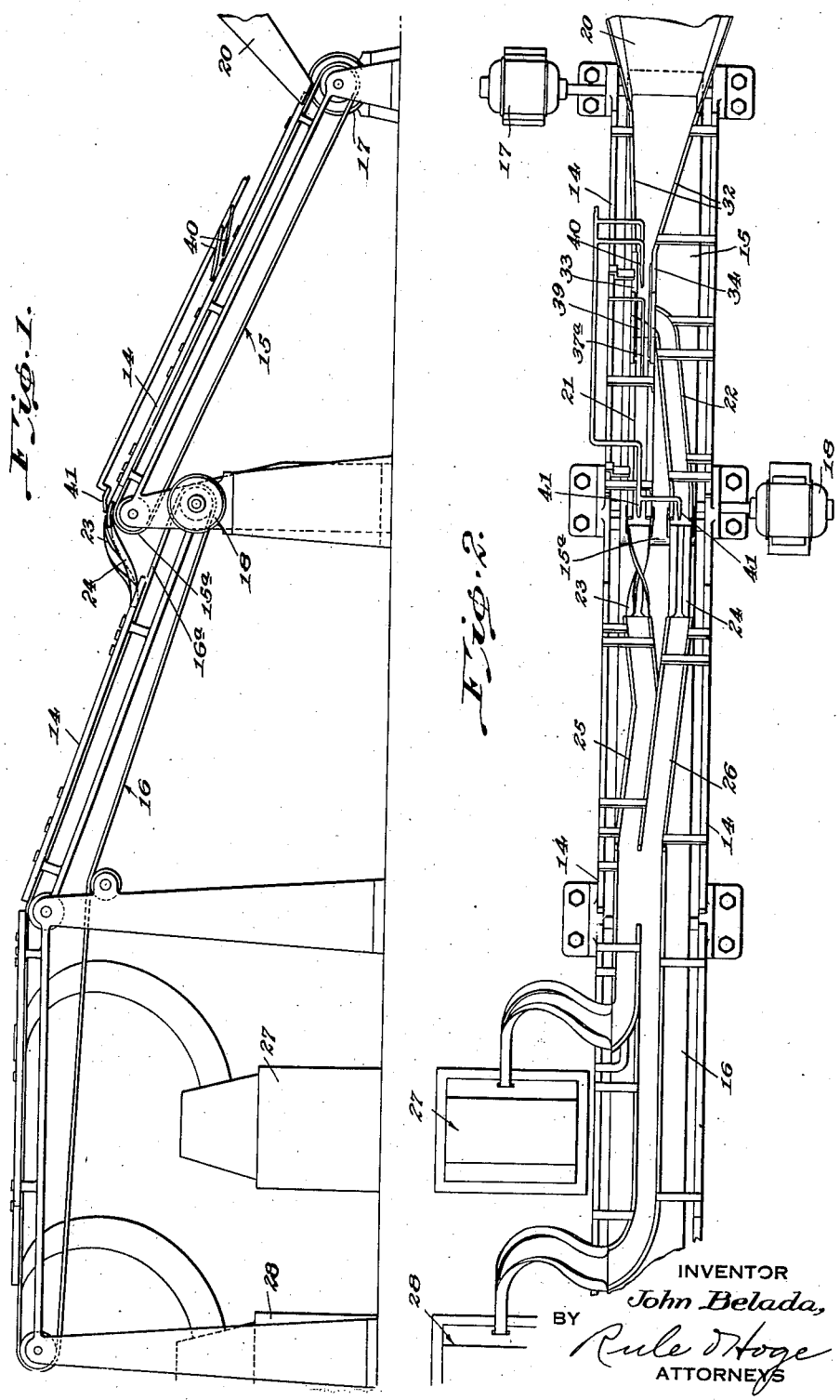
INVENTOR
John Belada,
BY
Rule & Hoge
ATTORNEYS

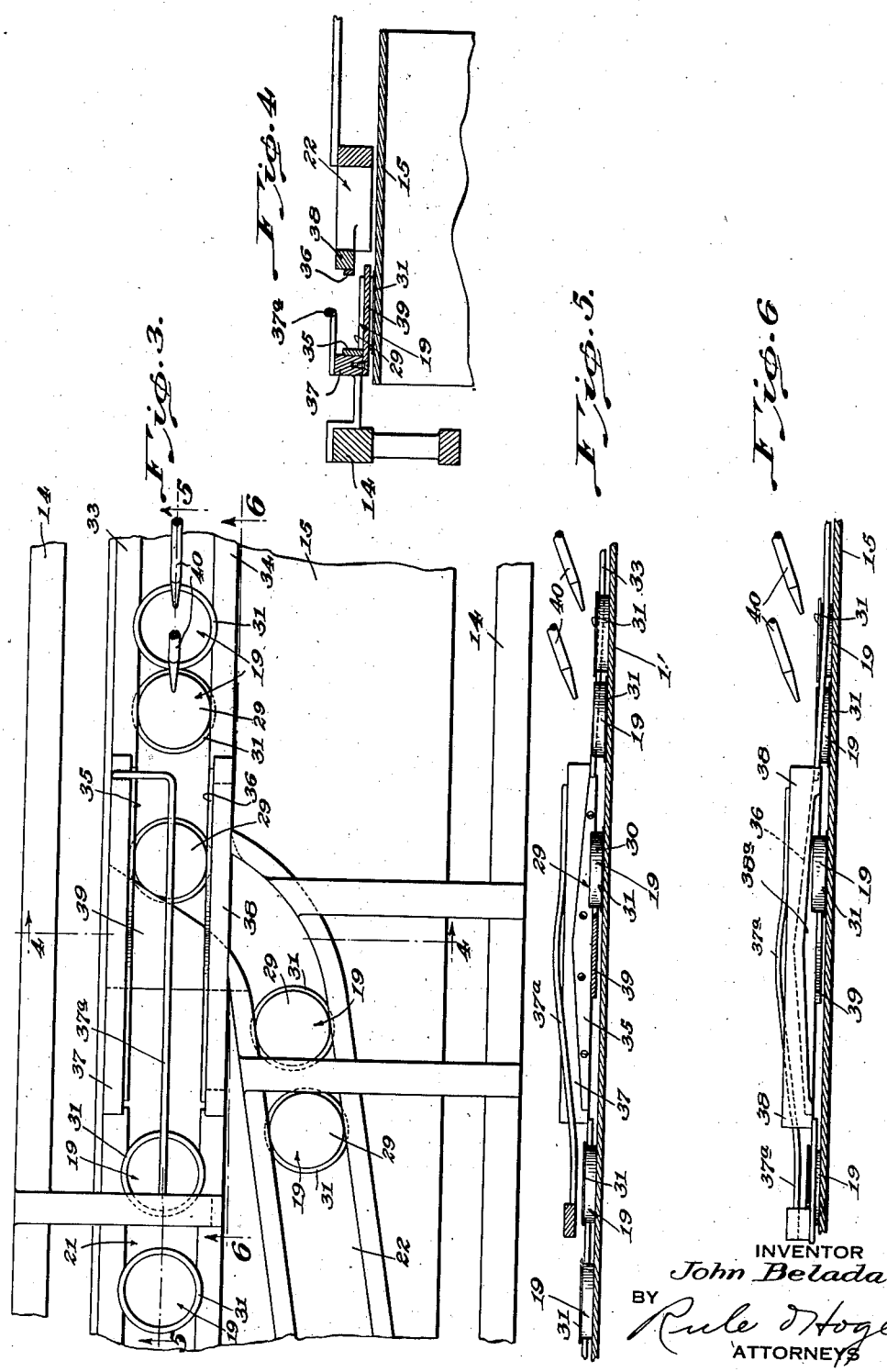

April 11, 1944.　　　　J. BELADA　　　　2,346,549
MECHANISM FOR HANDLING CLOSURE BLANKS
Filed June 12, 1942　　　3 Sheets-Sheet 3
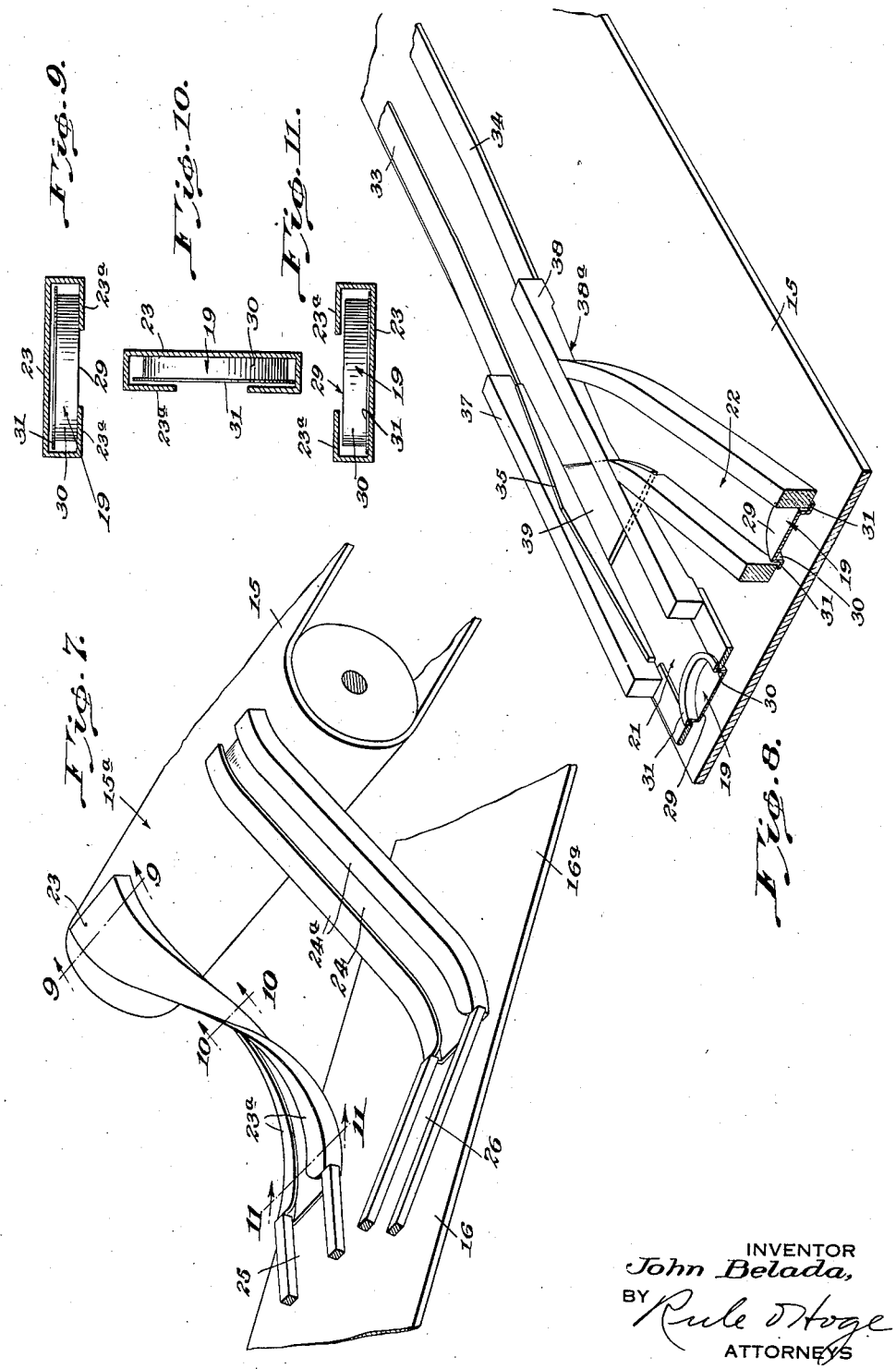
INVENTOR
John Belada,
BY Rule & Hoge
ATTORNEYS Patented Apr. 11, 1944

2,346,549

UNITED STATES PATENT OFFICE 2,346,549

MECHANISM FOR HANDLING CLOSURE BLANKS

John Belada, Glassboro, N. J., assignor to Owens-Illinois Glass Company, a corporation of Ohio Application June 12, 1942, Serial No. 446,705

6 Claims. (Cl. 198—33)

My invention is an improvement in mechanism for handling closure blanks during delivery thereof from a blank forming machine to knurling and screw threading machines.

At present, a plurality of closure designs is lithographed or otherwise marked on a single sheet of metal and the sheet of metal is fed to a forming machine where closure blanks are cut from the sheet. The blanks consist of a circular top wall, a skirt depending from the top wall and a radial flange directed outwardly on the lower end of the skirt.

As the blanks are formed, they are delivered through a chute to an endless conveyor. They may be deposited on the conveyor in any manner, i. e., with the flanged open-side down or with the top wall contacting the conveyor, that is, open-side up. The blanks then travel on the conveyor to knurling and screw threading machines.

An object of my invention is the provision of novel and commercially practicable means associated with a closure blank conveyor between a blank forming machine on the one hand and screw threading and knurling machines on the other, for properly positioning blanks preparatory to introducing them into either of the last two machines.

Another object of my invention is the provision, in conjunction with a conveyor for transferring metal closure blanks from a blank forming machine to screw threading and knurling machines, of means for inverting certain blanks whereby all transferred will be positioned open-side down on the conveyor prior to reaching the latter machines. Such inversion incidentally is effected at the earliest moment practicable after discharge from the blank forming machine in order to shorten the period of time blanks travel with their lithographed, or otherwise decorated top surface in contact with the conveyor. This reduces the danger of marring the top surfaces.

Other objects will be in part apparent and in part pointed out hereinafter.

In the drawings:

Fig. 1 is a side elevational view of the double conveyor system used in delivering closure blanks from a blank forming machine to knurling and screw threading machines.

Fig. 2 is a top plan view.

Fig. 3 is a fragmentary top plan view of the conveyor nearest the blank forming machine delivery chute showing the deflector plate and elevating track.

Fig. 4 is a transverse sectional view taken on the line 4—4 of Fig. 3.

Fig. 5 is a longitudinal sectional view taken on the line 5—5 of Fig. 3.

Fig. 6 is a sectional view taken on the line 6—6 of Fig. 3.

Fig. 7 is a fragmentary perspective view of the transfer chutes at the discharge end of the first conveyor.

Fig. 8 is a fragmentary perspective view showing the closure deflector plate and the elevating track.

Figs. 9, 10, and 11 are sectional views taken on the lines 9—9, 10—10, and 11—11 respectively of Fig. 7.

Referring to Figs. 1 and 2, I have shown two endless conveyors, a first conveyor 15 and a second conveyor 16 having driving units 17 and 18 respectively, such as electric motors. The first conveyor 15 is inclined and has its upper discharge end 15$^a$ slightly overlapping the inclined receiving end 16$^a$ of the other conveyor 16.

A blank forming machine (not shown) forms the lithographed, or otherwise marked or decorated closure blanks 19 (Figs. 3, 5, and 6) and delivers the same to a chute 20 which directs them to the receiving or lower end of the first conveyor 15. This conveyor 15 carries each blank 19 through one of two guideways 21 and 22 (Figs. 2 and 3) to the discharge end thereof. The blank is discharged from the conveyor 15 through one of two transfer chutes 23 and 24, to the receiving end of the second conveyor 16 and then travels through one of two guideways 25 and 26 to knurling and screw threading machines 27 and 28.

The closure blanks 19, as formed by the blank forming machine, consist of a top wall 29, a depending skirt 30 and a radial outwardly directed flange 31 formed at the lower end of the skirt.

When the closure blanks are deposited on the first conveyor 15, they may assume either of two positions, i. e., they are deposited with the top wall of the blank resting on the conveyor or with the flange 31 resting thereon. This is due to the fact that the blanks roll or slide down the chute 20 onto the conveyor and land at random upon the latter. Immediately after the blanks have been deposited on the first conveyor, they are carried forward and away from the discharge chute 20 by said conveyor 15 and are converged into a single line or file, by two stationary guides 32 (Fig. 2).

The closure blanks are maintained in a single line by two stationary guide bars 33 and 34 (Fig. 3) positioned slightly above the conveyor and secured to a frame 14. The radial flange 31 of the closure blanks 19 that are resting open-side down on the conveyor, rides under the bars 33 and 34 (Fig. 3) and the flange of the closure blanks which are resting open-side up on the conveyor, rides above the bars 33 and 34.

The ends of the bars 33 and 34 nearest the guideways 21 and 22, merge into elevating tracks 35 and 36 respectively. The track 35 is secured to a bar 37 that bridges a space between the end of the bar 33 and one side member of the guideway 21. The track 36 is secured to a similar bar 38 that bridges a space between the end of the bar 34 and the other side member of the guideway 21.

The purpose of the elevating track members 35 and 36 is to contact the under side of the flanges 31 of the blanks 19 which have been riding on the top wall 29 on the conveyor, and carry the blank up and over a deflector plate or bumper 39, into the guideway 21. Compressed air supplied through jets 40, positioned over the single line of closure blanks, induces continued forward movement of the blanks when they lose contact with the conveyor (Figs. 3 and 5).

As the blanks are forced up the elevating tracks 35 and 36 by the air jets 40, they engage a stationary restraining rod 37a positioned between the tracks and above the closure blanks. The purpose of this restraining rod is to keep the closure blanks on the tracks and guide them into the guideway 21. One end of the rod 37a is secured to the bar 37 and the other end is secured to a cross bar of the frame 14.

The deflector plate 39 is secured to the under side of the bar 37 (Figs. 3 and 4) medially of the ends thereof and in the path of the single line of closure blanks coming from the blank forming machine. The purpose of the deflector plate is to divert the closure blanks 19, that are riding on the conveyor 15 with the flanges 31 down, to the guideway 22. The under side of the bar 38 (Fig. 6) is cut away to form a passageway 38a permitting the closure blanks that are deflected by the plate 39, to pass into the guideway 22. The air jets 40 also facilitate the forward movement of the blanks that are diverted to the guideway 22.

Positioned at the discharge end of the conveyor and secured to the forward end of the side member forming the guideways 21 and 22, are the two downwardly inclined chutes 23 and 24. The chutes 23 and 24 are substantially U shaped in cross section. The open end of each chute has a pair of inwardly directed horizontal flanges 23a and 24a respectively. The chute 23 is transversely twisted medially of its open ends to provide means whereby a closure blank entering the chute from the guideway 21 at the discharge end of the conveyor 15, with its flange 31 up, may be delivered to the conveyor 16 with its flange 31 down on the conveyor (Figs. 1, 2, and 7).

Compressed air is supplied through jets 41 positioned over the guideways 21 and 22 and near the discharge end of the conveyor 15, to facilitate continued forward movement of the closure blanks 19 from the conveyor to the chutes 23 and 24.

Referring to Fig. 9 it will be noted that the closure blank 19 in first entering the chute 23, has its top wall or cover 29 resting on the flanges 23a of the chute. Fig. 10 shows the relative position of the closure blank and the chute, midway of the travel of the blank through the chute. Referring to Fig. 11 it will be noted that the closure blank in leaving the chute, has its flange 31 bearing on the closed side of the U-shaped chute and the chute flanges 23a serve as means to keep the blank within the confines of the chute until the blank reaches the end thereof.

The chute 24 serves as a means to deliver the closure blanks 19 from the guideway 22, to the conveyor 16 and the only purpose of the flanges 24a is to keep the closure blanks within the confines of the chute during the travel therethrough.

The space between the flanges 23a of the chute 23 and between the flanges 24a of the chute 24 may well be used to free closure blanks that accidentally become lodged in the chutes.

The lower ends of the transfer chutes 23 and 24 deposit all of the closure blanks formed by the forming machine, into the guideways 25 and 26 on the moving conveyor 16, with the flanges 31 of all of the closure blanks resting on the conveyor. The top walls 29 of the closure blanks 19 are thus prevented from being scratched by the conveyor belt while they are being fed to the knurling and screw threading machines 27 and 28.

I have shown two knurling and screw threading machines 27 and 28 and two guideways 25 and 26 feeding closure blanks thereto. However, it will be readily understood that the guideways 25 and 26 may be divided at any point beyond the lower end of the two transfer chutes into any number of guideways leading to any number of knurling and screw threading machines. The number of knurling and screw threading machines needed of course depends upon the output of the blank forming machine.

Modifications may be resorted to within the spirit and scope of the appended claims.

I claim:

1. Apparatus of the character described comprising a continuously moving conveyor having article receiving and discharging ends, means for placing articles having opposed open and closed sides at random on the receiving end of the conveyor, means for segregating differently positioned articles while moving along the conveyor to thereby place the articles which are open-side up in one longitudinal zone and the remaining articles in another such zone on the conveyor, inclined delivery chutes individual to said zones and to the upper end of which the conveyor conducts said articles, one chute being twisted about its longitudinal axis to thereby invert all articles delivered thereto and thereby insure like positioning of all articles discharged from the chutes, said article segregating means including a pair of guideways overlying the conveyor and extending generally lengthwise thereof, one of said guideways being connected to the other guideway in proximity to the receiving end of the conveyor, and means whereby certain articles are permitted to travel along one of said guideways and the remaining articles directed into the other guideway, the last named means including a track positioned substantially at the juncture of the two guideways and operating to elevate the articles arriving right-side up at said juncture point.

2. Apparatus of the character described comprising a continuously moving conveyor having article receiving and discharging ends, means for placing articles having opposed open and closed sides at random on the receiving end of the conveyor, means for segregating differently positioned articles while moving along the conveyor to thereby place the articles which are open-side up in one longitudinal zone and the remaining articles in another such zone on the conveyor, inclined delivery chutes individual to said zones and to the upper end of which the conveyor conducts said articles, one chute being twisted about its longitudinal axis to thereby invert all articles delivered thereto and thereby insure like positioning of all articles discharged from the chutes, said article segregating means including a pair of guideways overlying the conveyor and extending generally lengthwise thereof, one of said guideways being connected to the other guideway in proximity to the receiving end of the conveyor, and means whereby certain articles are permitted to travel along one of said guideways and the remaining articles directed into the other guideway, the last named means including a track positioned substantially at the juncture of the two guideways and operating to elevate the articles arriving right-side up at said juncture point, and a deflector for directing the other articles to said other guideway.

3. Apparatus of the character described comprising a continuously moving conveyor having article receiving and discharging ends, means for placing articles having opposed open and closed sides at random on the receiving end of the conveyor, means for segregating differently positioned articles while moving along the conveyor to thereby place the articles which are open-side up in one longitudinal zone and the remaining articles in another such zone on the conveyor, inclined delivery chutes individual to said zones and to the upper end of which the conveyor conducts said articles, one chute being twisted about its longitudinal axis to thereby invert all articles delivered thereto and thereby insure like positioning of all articles discharged from the chutes, said segregating means including a main guideway overlying the conveyor and extending longitudinally thereof, a second guideway extending generally lengthwise of the conveyor and communicating with the main guideway at a point in proximity to the receiving end of the conveyor, elevating tracks provided in the main guideway substantially at its point of juncture with the other guideway for elevating the articles which are right-side up as they approach the juncture of the two guideways whereby to insure movement of said articles along the main guideway, and means for accelerating movement of the articles along the elevating tracks.

4. Apparatus for handling metal closure blanks which have flanged attaching skirts, said apparatus comprising a continuously moving conveyor, a main guideway for the blanks overlying and extending lengthwise of said conveyor, a second guideway arranged along side of the main guideway and having one end connected to the latter, means for deflecting to the second guideway those blanks which are lying open-side down in the main guideway, elevating means to engage the flanges of the other blanks and lift them above said deflecting means, and means independent of the conveyor for inducing forward movement of the elevated blanks.

5. Apparatus for handling metal closure blanks which have flanged attaching skirts, said apparatus comprising a continuously moving conveyor, a main guideway for the blanks overlying and extending lengthwise of said conveyor, a second guideway arranged along side of the main guideway and having one end connected to the latter, means for deflecting to the second guideway those blanks which are lying open-side down in the main guideway, elevating means to engage the flanges of the other blanks and lift them above said deflecting means, and means independent of the conveyor for inducing forward movement of the elevated blanks, said last named means including nozzles for directing air under pressure against certain surfaces of the elevated blanks.

6. Apparatus for handling metal closure blanks which have flanged attaching skirts, said apparatus comprising a continuously moving conveyor, a main guideway for the blanks overlying and extending lengthwise of said conveyor, a second guideway arranged along side of the main guideway and having one end connected to the latter, means for deflecting to the second guideway those blanks which are lying open-side down in the main guideway, and elevating means to engage the flanges of the other blanks and lift them above said deflecting means.

JOHN BELADA.